United States Patent [19]

Page

[11] Patent Number: 5,655,570

[45] Date of Patent: Aug. 12, 1997

[54] CONDENSATE DRAIN DEVICE

[75] Inventor: John Kenneth Rurik Page, Camberley, United Kingdom

[73] Assignee: Permea, Inc., St. Louis, Mo.

[21] Appl. No.: 651,031

[22] Filed: May 21, 1996

[51] Int. Cl.⁶ .................................. F15D 1/02
[52] U.S. Cl. .................. 138/39; 138/42; 55/320
[58] Field of Search .................. 138/39, 41, 42, 138/44, 40; 55/320, 332; 96/152; 137/550

[56] References Cited

U.S. PATENT DOCUMENTS

| | | |
|---|---|---|
| 63,680 | 4/1867 | White . |
| 375,624 | 12/1887 | Hallowell . |
| 568,684 | 9/1896 | Howard et al. . |
| 895,702 | 8/1908 | Wales . |
| 1,441,046 | 1/1923 | Vance et al. . |
| 1,687,286 | 10/1928 | Freer ........................... 138/40 |
| 2,040,735 | 5/1936 | Gerdts . |
| 2,190,138 | 2/1940 | Smith et al. . |
| 2,585,045 | 2/1952 | Schmidlin . |
| 2,619,985 | 12/1952 | Wilkerson . |
| 2,766,066 | 10/1956 | Hopson et al. . |
| 3,750,959 | 8/1973 | Weikert . |
| 3,842,856 | 10/1974 | Asfura . |
| 3,877,895 | 4/1975 | Wonderland et al. ............ 138/44 |
| 3,887,137 | 6/1975 | Nakamura et al. . |
| 3,908,694 | 9/1975 | Spears . |
| 3,920,189 | 11/1975 | Maggiacomo et al. ........... 137/550 |
| 3,984,051 | 10/1976 | Labbé et al. . |
| 4,072,290 | 2/1978 | Neyret ........................... 137/550 |
| 4,086,774 | 5/1978 | Duggins . |
| 4,116,650 | 9/1978 | Lane . |
| 4,141,379 | 2/1979 | Manske ........................... 137/550 |
| 4,159,805 | 7/1979 | von Lutzow . |
| 4,202,501 | 5/1980 | Haynes . |
| 4,278,234 | 7/1981 | Baumann . |
| 4,320,778 | 3/1982 | Baumann . |
| 4,345,767 | 8/1982 | Neal . |
| 4,400,187 | 8/1983 | Lane . |
| 4,464,186 | 8/1984 | Mann . |
| 4,496,309 | 1/1985 | Schächter . |
| 4,708,157 | 11/1987 | Sabatino . |
| 4,711,399 | 12/1987 | Rosenberg . |
| 4,722,481 | 2/1988 | Lemkin . |
| 4,863,499 | 9/1989 | Osendorf ....................... 55/320 |
| 4,874,408 | 10/1989 | Overby . |
| 4,897,094 | 1/1990 | Maeda . |
| 4,915,714 | 4/1990 | Teague et al. . |
| 4,991,778 | 2/1991 | Maas et al. . |
| 5,011,075 | 4/1991 | Vandiver . |
| 5,011,519 | 4/1991 | Maeda . |
| 5,030,262 | 7/1991 | Overby . |
| 5,114,443 | 5/1992 | Overby . |
| 5,121,881 | 6/1992 | Lembeck . |
| 5,131,387 | 7/1992 | French et al. . |
| 5,174,798 | 12/1992 | Luby . |
| 5,232,164 | 8/1993 | Resch et al. . |
| 5,259,995 | 11/1993 | Matalis . |
| 5,277,577 | 1/1994 | Schachter et al. . |
| 5,490,777 | 2/1996 | Matsumoto . |

*Primary Examiner*—David Scherbel
*Assistant Examiner*—James F. Hook
*Attorney, Agent, or Firm*—Mark L. Rodgers; William F. Marsh

[57] ABSTRACT

The present invention provides a condensate drain device suitable for use in high pressure systems where liquid condensate is removed. The device, through use of a wicking disk, allows removal of the condensate from the system without significant reduction in pressure or interruption of the system. There are no moving parts in the device thereby allowing continuous operation of the condensate drain without interruption.

6 Claims, 3 Drawing Sheets

CONDENSATE DRAIN DEVICE

BACKGROUND OF THE INVENTION

The present invention relates to a drain device for the removal of condensate from systems under pressure. For example, in a gas dehydration system, the system is under a continuous steady pressure and the gas is dehydrated continuously by means of a process such as a pressure swing adsorption process or a membrane process or the like. In a continuous process under pressure, any significant deviation in the pressure reduces the efficiency of the process by a multiple factor. Thus in the dehydration of a gas under pressure, moisture should be removed on a continuous basis without a significant reduction in the pressure of the system or without interruption of the continuous flow.

Many devices have been developed to drain condensate from systems used for dehydration of a gas. Most generally these devices require interruption of the process entirely or a variation in the system pressure which substantially reduces the efficiency of the system.

U.S. Pat. Nos. 4,116,650 and 4,400,187 to Arlo E. Lane disclose a device for eliminating droplets of water from a stream of compressed air in which the air is passed through a plug of porous water absorbent material which absorbs the droplets. Continued passage of the air through the plug evaporates the water from the plug. In this situation, compressed air is needed to effect the evaporation.

U.S. Pat. No. 4,345,767 to Brian P. Neal utilizes the action of a piston which is deflected upwardly to permit ejection of moisture through an aperture into which the piston fits. This device requires the system pressure be interrupted during ejection of water.

U.S. Pat. No. 4,874,408 to Kenneth W. Overby features a drain which is an enclosed bowl suspended beneath a sump, and an aspiration tube which extends from within the bowl such that air circulated into the bowl causes the liquid to be aspirated through the tube. This device requires a change in pressure to aspirate the liquid.

In continuous gas systems, such as dehydration of gas, the moisture is ordinarily condensed upon the moisture leaving the primary dehydration stream. Upon condensation it is desirable to remove the liquid from the system continuously.

The present invention provides a device for continuously removing liquid condensate from continuous systems under pressure without significant lowering of the pressure or interruption of the system.

SUMMARY OF THE INVENTION

The present invention provides a condensate drain device with no moving parts which continuously removes liquid condensate from gas systems under pressure.

The condensate drain device comprises (a) a metal housing substantially cylindrical in shape having a two-stage central longitudinal bore, an upper stage wherein the bore is threaded internally and is larger than a lower stage wherein the bore is threaded internally to accommodate a conduit; (b) a metal cap shaft externally threaded just below the cap and adapted to be screwed into the upper stage bore of the housing, the cap shaft having a two-stage central longitudinal bore wherein an upper stage bore is internally threaded to accommodate a conduit and is larger than a lower stage bore, the lower stage bore exiting through a shaft face, the face having cross shaped slots; (c) a wicking disk, seated in the upper stage bore of the housing, circular in shape with an uncompressed thickness up to about 3 mm and having a hole in the center, the disk circumference being substantially equal to the circumference of the interior of the upper stage bore of the housing; and (d) a baffle disk, circular in shape residing on top of the wicking disk, the baffle disk having a circumference slightly smaller than the circumference of the interior of the upper stage bore of the housing and having a thickness up to about 2 mm such that when the cap shaft is screwed into the upper stage bore of the housing, pressure is applied by the face of the cap shaft to the metal baffle disk.

The condensate drain device functions in a very simple manner. Liquid enters the upper stage bore of the cap shaft and travels downwardly through the cap shaft bore to the shaft face where the liquid travels horizontally in the slots of the cap shaft face toward the wall of the upper stage bore of the housing. The liquid then travels downwardly in the space between the baffle disk and the upper stage bore wall to the wicking disk below the baffle disk. The liquid then again travels horizontally by means of wicking from the outer edge of the wicking disk to the center of the disk where the liquid exits through the hole in the wicking disk and travels downwardly through the lower stage bore of the housing where the liquid exits the drain device into a conduit or other suitable receptacle means. When the liquid leaves the wicking disk, the liquid is no longer under the positive pressure of the system.

Although the entry pressure of the gas containing the liquid condensate may be 100 psi at the entry into the drain device at the top of the bore of the cap shaft, there is very little pressure loss through the exit of the housing lower stage bore. The compression applied to the wicking disk by the baffle disk prevents the escape of a significant amount of gas through the wet wicking disk while the liquid proceeds to drain efficiently and rapidly.

DETAILED DESCRIPTION OF THE INVENTION

Figure 1:
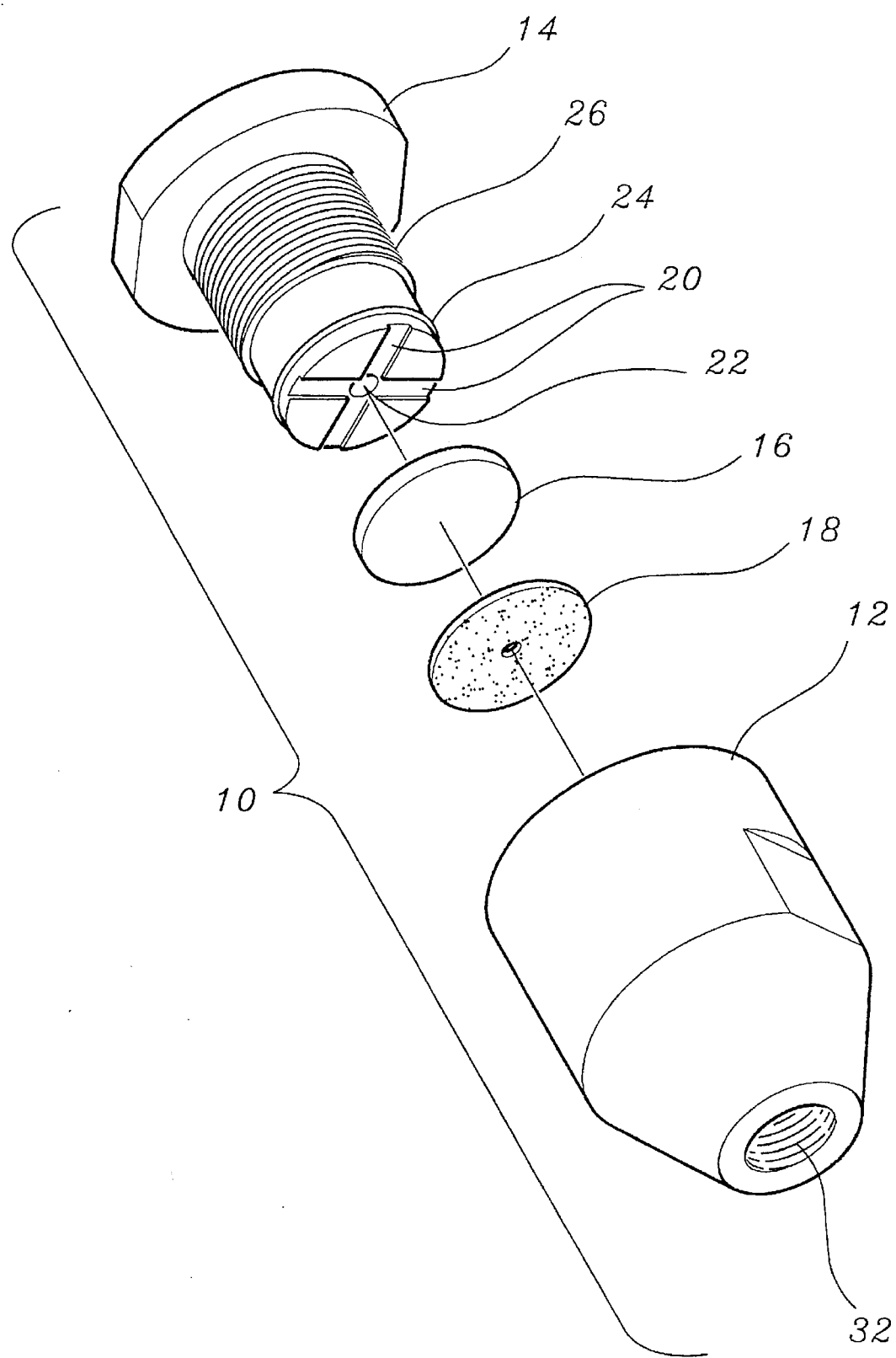
FIG. 1 is an exploded perspective view of one embodiment of the present invention.
Figure 2:
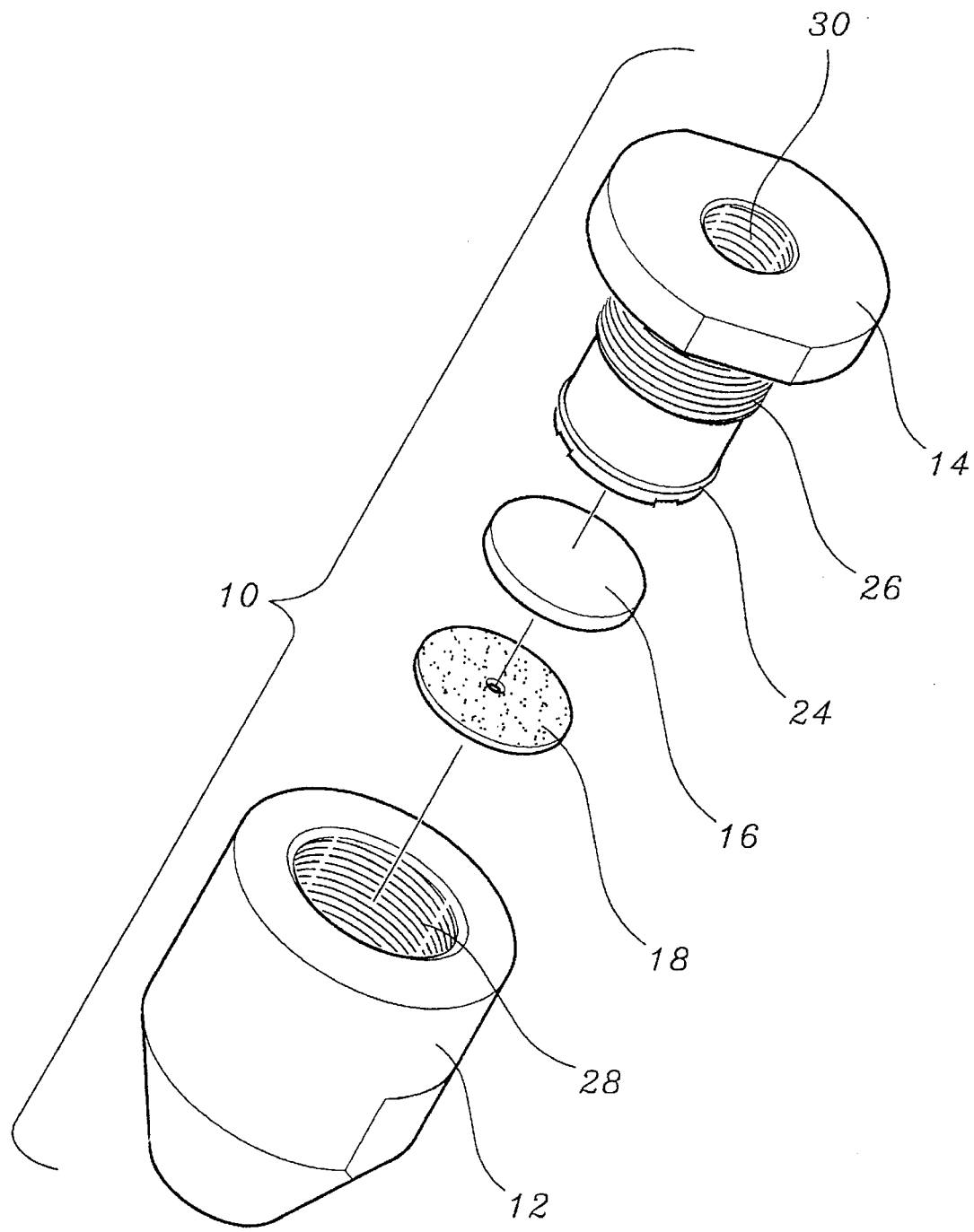
FIG. 2 is another exploded perspective view of the same embodiment of the present invention.

FIG. 1 and FIG. 2 illustrate exploded perspective views of a condensate drain device 10. The device 10 has a metal housing 12 substantially cylindrical in shape. The housing 12 has a two-stage central longitudinal bore 28 and 32. The upper stage bore 28 is larger than the lower stage bore 32. Each of the stages of the bore 28 and 32 are threaded at least part way from the exterior of the bore inwardly. The larger stage bore 28 accommodates a cap shaft 14. The threaded portion 26 of the cap shaft 14 mates with the threaded portion 28 of the metal housing. The cap shaft 14 preferably has a gasket 24 seated in a notch on the lower portion of the cap shaft 14. The gasket 24 prevents seepage of air up the cap shaft 14.

The face of the cap shaft 14 has shallow slots 20 to allow liquid to proceed from the exit 22 of the longitudinal bore to the outside edge of the cap shaft 14. When the cap shaft 14 is screwed into the housing 12, the slots 20 on the cap shaft face contact a baffle disk 16. The baffle disk 16 is a hard disk, e.g., metal, plastic or the like, and is slightly smaller than the upper stage bore 28 of the housing 12. This allows liquid which has proceeded from the exit 22 through the slots 20 to the edge of the disk 16 to proceed downwardly at the outside edge of the disk 16 to make contact with the wicking disk 18.

The wicking disk 18 circumferentially fits snugly into the upper stage bore 28 of the housing 12. The wicking disk 18 is made of a material which readily allows liquid to wick from one portion of the disk to another. The wicking disk 18 has a hole in the center to allow liquid to easily exit downwardly through the lower stage bore 32 to a conduit or suitable receptacle.

Figure 3:
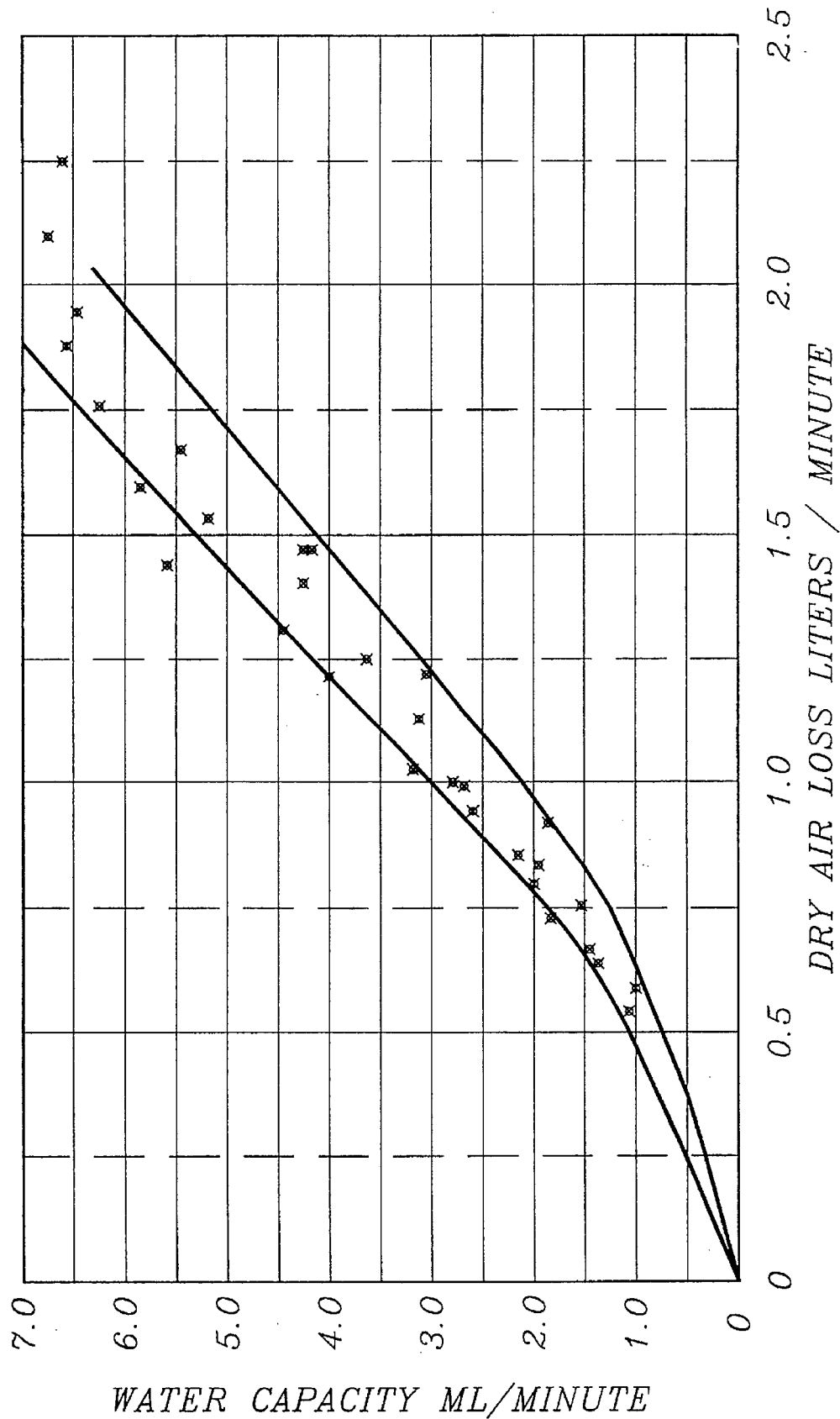
FIG. 3 is a graph depicting dry air loss v. water removal capacity.

When the cap shaft 14 is screwed into place in the upper stage bore 28 of the housing 12, pressure is placed on the baffle disk 16 which in turn compresses the wicking disk 18. The desired amount of pressure applied by the cap shaft 14, can be determined by utilizing the graph depicted in FIG. 3. For instance, if it is desired that approximately 3 ml of liquid exit the system per minute then with the system under operating pressure, the cap shaft 14 would be screwed into the upper stage bore 28 until a dry air loss of 1 liter of air per minute escapes the exit from the lower stage bore 32. It is important that the pressure setting of the cap shaft 14 be carried out when the device 10 and the wicking disk 18 are dry and the system is under its operating pressure. Although up to 2 liters or more of dry air per minute may escape through the exit 32 of the device 10 when the wicking disk 18 is dry, only minuscule portions of gas escape when the system is operating and the wicking disk 18 is wet.

The wicking disk is preferably made of a material which can be wetted by a liquid such as water, but which is not substantially swellable nor very absorbing. Examples include polypropylene, polyester and the like. One of the preferred materials for use as a wick disk is a non-woven fabric. The wicking disk is up to about 3 mm thick, preferably from about 2 to about 2.5 mm in thickness. When the wicking disk is compressed by the pressure of the baffle disk, the thickness of the wicking disk is diminished to about 0.4 mm.

Typical uses of the device of the present invention include systems for dehydrating gases. For instance, in the dehydration of natural gas, one method for removing the small amount of moisture in the gas is by use of a dehydration membrane. The membrane is made up of hollow fibers in a module and the gas is passed through the module under a high pressure of several hundred psi. As the gas contacts the membrane surface, the moisture in the gas rapidly passes through the membrane thus effecting a separation of the gas and the moisture. The moisture is then condensed to liquid form and exits the system through the condensate drain device of this invention.

Because little or no pressure is lost when condensate exits a high pressure system through the device of the present invention, the device of the present invention is suitable for use in many high pressure systems wherein it is desirable to remove condensate without interruption of the operation of the system.

I claim:

1. A condensate drain device comprising:
   (a) a metal housing substantially cylindrical in shape having a two-stage central longitudinal bore, an upper stage wherein the bore is threaded internally and is larger than a lower stage wherein the bore is threaded internally to accommodate a conduit;
   (b) a metal cap shaft externally threaded just below the cap and adapted to be screwed into the upper stage bore of the housing, the cap shaft having a two-stage central longitudinal bore wherein an upper stage bore is internally threaded to accommodate a conduit and is larger than a lower stage bore, the lower stage bore exiting through a shaft face, the face having cross shaped slots;
   (c) a wicking disk, seated in the upper stage bore of the housing, circular in shape with a thickness up to about 10 mm and having a hole in the center, the disk circumference being substantially equal to the circumference of the interior of the upper stage bore of the housing; and
   (d) a baffle disk, circular in shape residing on top of the wicking disk, the baffle disk having a circumference slightly smaller than the circumference of the interior of the upper stage bore of the housing such that when the cap shaft is screwed into the upper stage bore of the housing, pressure is applied by the face of the cap shaft to the baffle disk.

2. The device of claim 1 wherein the baffle disk applies pressure on the wicking disk thereby compressing the wicking disk.

3. The device of claim 1 wherein the wicking disk is polypropylene.

4. The device of claim 1 wherein the wicking disk is polyester.

5. The device of claim 1 wherein the baffle disk is metal.

6. The device of claim 1 wherein the exterior of a lower portion of the cap shaft has a circumferential notch to accommodate a gasket surrounding the shaft.

* * * * *